Sept. 22, 1959 B. D. LOUGHLIN 2,905,753

COLOR-TELEVISION TRANSMITTING SYSTEM

Original Filed May 1, 1950 3 Sheets-Sheet 1

COLOR-TELEVISION TRANSMITTING SYSTEM

COLOR-TELEVISION TRANSMITTING SYSTEM

Original Filed May 1, 1950 3 Sheets-Sheet 3

United States Patent Office 2,905,753
Patented Sept. 22, 1959

2,905,753

COLOR-TELEVISION TRANSMITTING SYSTEM

Bernard D. Loughlin, Huntington, N.Y., assignor to Hazeltine Research, Inc., Chicago, Ill., a corporation of Illinois Original application May 1, 1950, Serial No. 159,212, now Patent No. 2,773,929, dated December 11, 1956. Divided and this application November 2, 1956, Serial No. 620,123

5 Claims. (Cl. 178—5.4)

*General*

Figures 1, 3A, 3B, 3C:
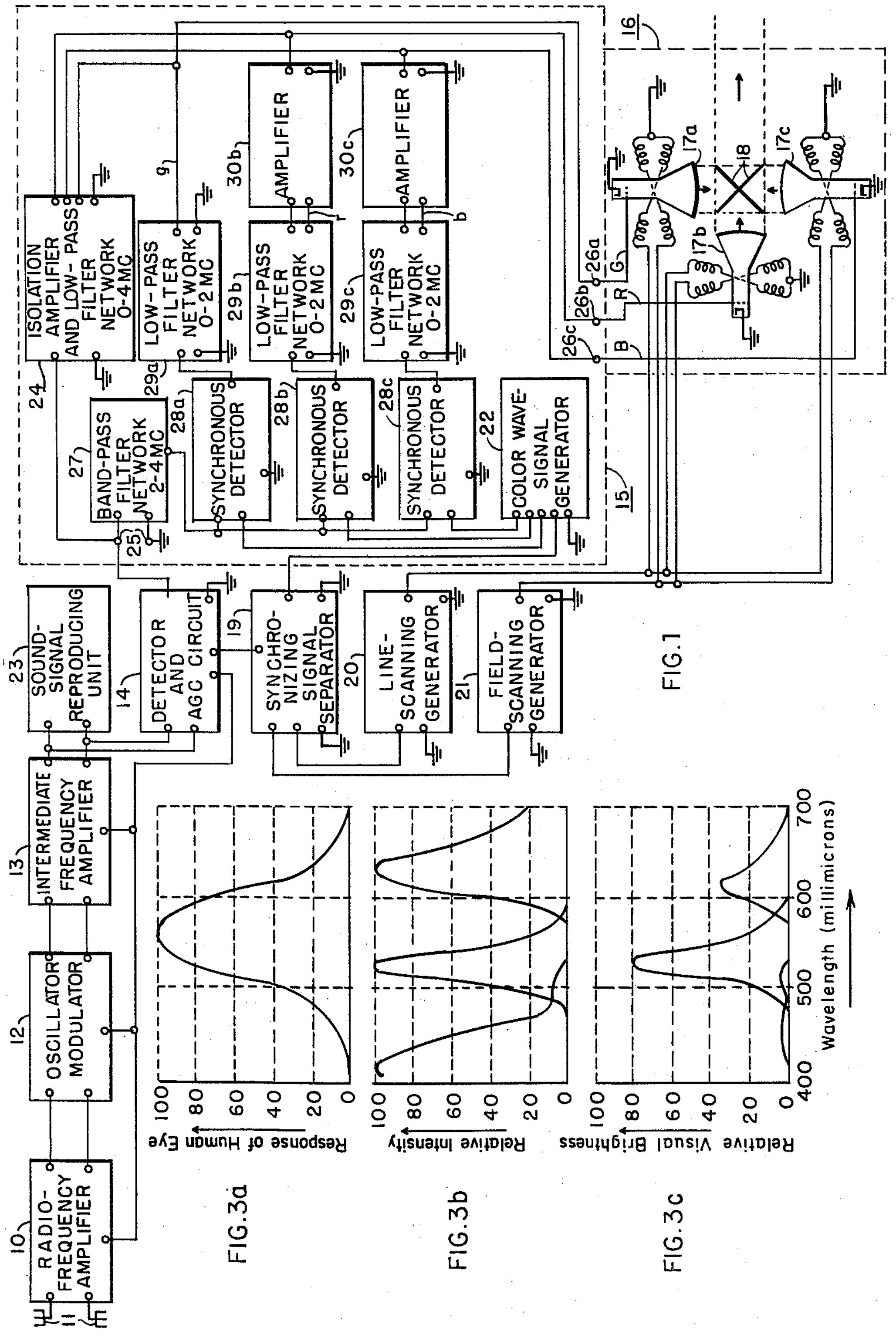

The present invention relates, in general, to color-television transmitting systems, especially to such systems compatible with standardized monochrome systems, and in particular to new and improved transmitting systems for use with color-television receivers, which have the characteristic of reducing the annoyance to the viewer of a reproduced image of random brightness noise fluctuations therein. By means of the present invention the design of such systems to provide improved compatibility is facilitated and the service area of the transmitted signal is increased.

This application is a division of applicant's copending application entitled "Constant Luminance Color-Television System," Serial No. 159,212, filed May 1, 1950, now Patent No. 2,773,929, issued Dec. 11, 1956.

A compatible color-television system is one which provides a color-television signal which produces in a conventional monochrome receiver a black-and-white image that is equivalent in all respects to the images normally reproduced therein. In such a system all of the line-scanning and field-scanning frequencies are the same as those in the conventional monochrome system and the composite video-frequency component of the color-television signal is developed in such a manner that those signals derived therefrom and which are peculiar to the color characteristics of the image have low visibiilty when viewed on the conventional monochrome receiver.

In a color-television receiver, reproduction of the image may be effected by a single color tube or a plurality of color tubes. If the latter are used, a number of related electron beams are so generated as to scan and illuminate the screens of a similar number of cathode-ray tubes in a series of fields of parallel lines. In one type of color-television reeciver, the composite video-frequency signal is analyzed and the monochrome and color-signal components selected therefrom are applied to the control electrodes of the cathode-ray tubes to control the intensities of the electron beams therein, thereby controlling the brightness and color characteristics of the image reproduced on the screens of these tubes. The line-scanning, field-scanning and color-sampling synchronizing components are separated from the composite video-frequency signal and from each other and are utilized respectively to synchronize the operation of the receiver line-scanning, field-scanning and color-signal selection apparatus with similar apparatus utilized at the transmitter in developing the composite video-frequency signal. The televised image, in either monochrome or color, is thereby reconstructed at the receiver, respectively, as a black-and-white or color picture.

In one form of compatible television system, more fully described in the RCA Review for December 1949, volume X, pages 504–524, the primary colors of the image being televised are sampled at the transmitter by a device having symmetrical electrical characteristics with respect to these colors, thereby utilizing approximately the same amount of electrical signal energy for green, red and blue color signals of similar color intensities. The sampling process develops a composite color signal having a color subcarrier wave signal of a frequency of approximately 3.8 megacycles which has amplitude and phase characteristics related to three different color-signal characteristics, being modulated in succession at 120° intervals by those color signals having frequencies in the band of 0–2 megacycles. In addition, a monochrome component is developed from the primary color signals, being composed of equal energy values of green, red and blue and having a band of 0–4 megacycles. The sum of this monochrome component and composite color-signal component produces a composite video-frequency signal. A sampling device similar to that just described is utilized at the receiver, sampling the composite video-frequency signal at 120° intervals to derive the 0–2 megacycle color signals therefrom. These color signals are then combined with the high-frequency components of the received monochrome signal to provide color signals of high resolution for application to the control electrodes of the cathode-ray tubes.

In such a symmetrical system, the derived color signals may include added noise-signal components. High-frequency random noise-signal components having frequencies above 2 megacycles but below the upper frequency limit of the video-frequency signal band, when heterodyned with the sampling frequency, produce low-frequency noise components in the 0–2 megacycle band. These heterodyned noise-signal components are in addition to the usual random low-frequency noise-signal components present in a monochrome type of television signal. Since similar noise-signal components occur in each of the color-signal channels, but at 120° phase relations with respect to each other, if the channels could be electrically combined, these noise signals would effectively cancel one another and substantially none of the added low-frequency noise-signal components of the type just described would appear as visual brightness or luminance noise in the reproduced image. However, such electrical coupling cannot be utilized, since it would effective cancel as well, substantially all the color-signal information in the different channels.

Though the previous paragraph described the effect of high-frequency random noise-signal components in a system including a sampling device operating at a sampling frequency, it should be understood that the added noise-signal components thus produced may have counterparts in added components of signals other than random noise, such added components being produced in a manner similar to the production of the added noise-signal components. Thus, interference signals having a substantially constant frequency may occur at the upper end of the 4 megacycle pass band of the system in such a manner that they would not normally be objectionable. But, by being heterodyned with the sampling frequency, such interference signals will produce very objectionable added low-frequency components in the reproduced image. Similarly, high-frequency components of the monochrome signal may be beat down to produce objectionable added low-frequency components in the reproduced image. Therefore, it is to be understood that, where the term "added noise-signal components" is used hereinafter, the expression is intended also to include all added low-frequency interference of the type just considered and of similar types.

It is known that low-frequency brightness noise components are more bothersome than high-frequency noise components to the observer of a reproduced image. It is also known that the sensitivity of the human eye to various colors having the same intensity is not identical:

that is, the luminance of the primary colors green, red and blue, having similar intensities, is widely different. The eye is most sensitive to green, less sensitive to red and much less sensitive to blue. Because of this difference in the luminance effects of the different primary colors, those added noise signals having similar energies which affect the different colors do not produce similar luminance effects and, therefore, do not cancel optically, as otherwise might be expected.

It would be desirable to be able effectively to eliminate the luminance fluctuations produced by those added low-frequency noise-signal components which may separately affect the different color signals and produce luminance noise in the reproduced image and which are inherently present in a symmetrical system of the type described above. By experiment it has been found that noise which produces luminance fluctuations is much more annoying to the observer than noise which produces color fluctuations without brightness fluctuations. This suggests that such luminance fluctuations may be eliminated by converting the noise brightness fluctuations to color fluctuations to which the eye is relatively insensitive.

It is an object of the present invention, therefore, to provide a new and improved transmitting system for a color-television system which avoids the aforementioned limitation of the symmetrical color-sequence system described.

It is another object of the present invention to provide a new and improved transmitting system for a color-television system of the type described having greatly increased compatibility for color and monochrome image reproduction.

It is still another object of the invention to provide a new and improved transmitting system for a color-television system of the type described in which the amount of luminance noise present in a reproduced image is substantially no greater than that present in a similar type of monochrome-television system.

It is a further object of the invention to provide a new and improved transmitting system for a color-television system of the type described in which at least some of the luminance noise produced locally within the color-television receiver is effectively canceled.

It is a still further object of the invention to provide a new and improved transmitting system for a color-television system in which a monochrome-signal component of a television signal substantially determines the luminance of a reproduced image and the color-signal components substantially determine the color characteristics thereof while any luminance effects produced thereby are substantially canceled.

In accordance with the invention, in a color-television system including a receiver of the constant luminance type which uses a compatible signal including luminance- and chrominance-representative signals, a color-television transmitting system comprises means for developing a plurality of color signals representative of different color components of an image, the color components being colors to which the eye has luminance sensitivities which may differ. The transmitting system also includes means for developing a signal representative of the luminance of the image and representing the aforesaid colors in proportion to their luminance sensitivities and means responsive at least to the color signals for developing a chrominance-representative signal comprising a wave signal modulated at different phases by modulation components representative of the difference between the color signals and the luminance signal. The system also includes means for transmitting the developed luminance and wave signals.

The term "monochrome signal" as used hereinafter represents that portion of the composite video-frequency signal that would be reproduced as an image in a standard monochrome receiver. Thus, the monochrome signal can be considered substantially to be the average of the composite video-frequency signal over a complete sampling cycle; in other words, being the composite video-frequency signal with any subcarrier signals and their modulation components, inserted to translate the color characteristics of an image, removed. The monochrome signal may be a signal including equal amounts of all color signals or may be a signal composed of a predominant amount of one of the primary colors.

The term "color signal" as used hereinafter represents a signal whose instantaneous value is proportional to the intensity of a primary color of an elemental area of the image being scanned at the transmitter. Portions of the frequency band of this signal are designated as "color-signal components."

As used hereinafter the word "color" is intended to define that which is combined with luminance to provide an image having color, that is, the word "color" is synonymous with hue and saturation.

The term "composite color-signal component" as used hereinafter represents that signal formed by the modulation of a generated color wave signal or subcarrier wave signal by selected frequency components of the color signal or, in other words, by color-signal components. The composite color-signal component has amplitude and phase characteristics related to the color characteristics of the image being televised.

The term "composite video-frequency component" as used hereinafter represents a signal resulting from the combination of the monochrome signal and the composite color-signal component.

For a better understanding of the present invention, together with other and further objects thereof, reference is had to the following description taken in connection with the accompanying drawings, and its scope will be pointed out in the appended claims.

Figure 2:
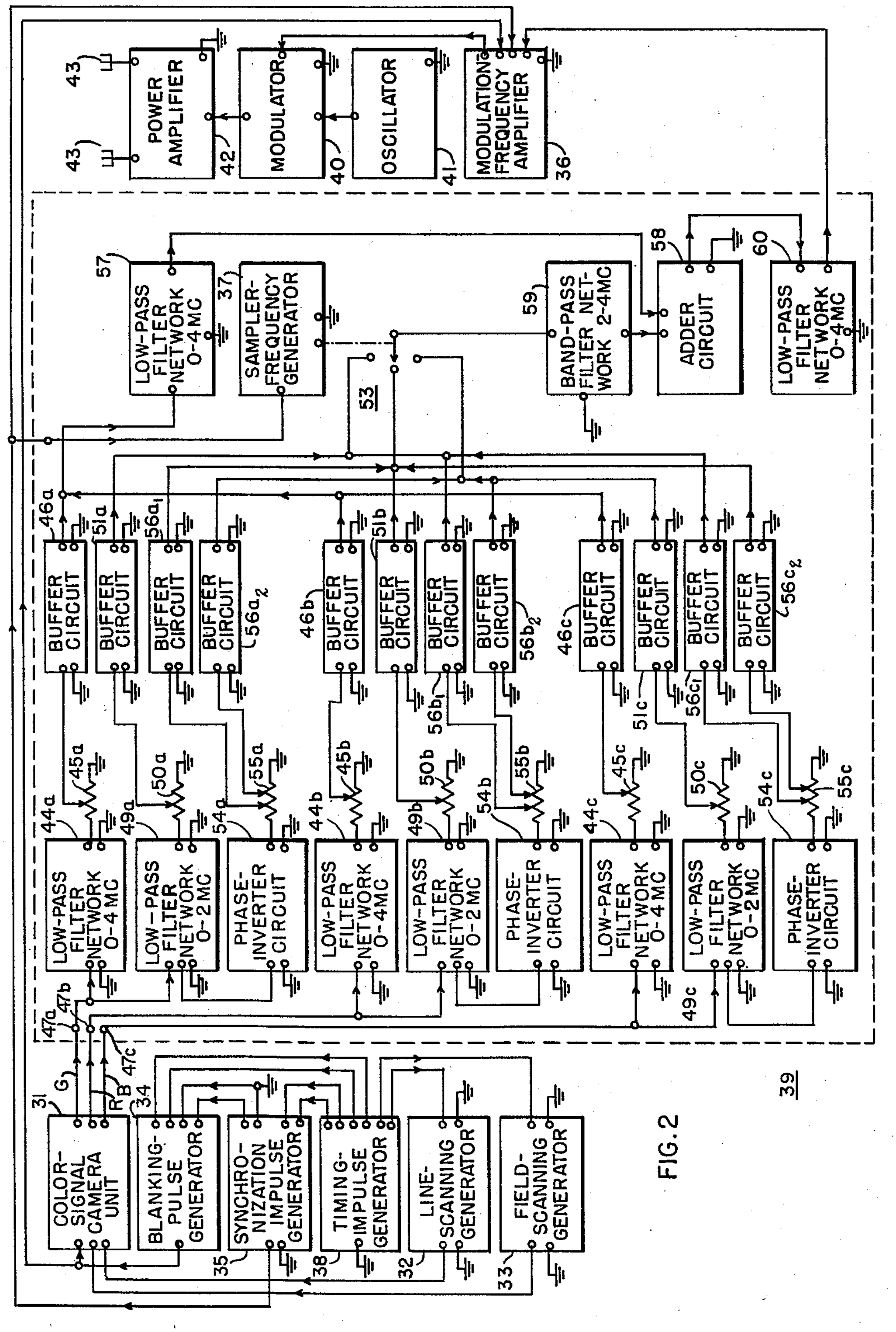
Figure 4:
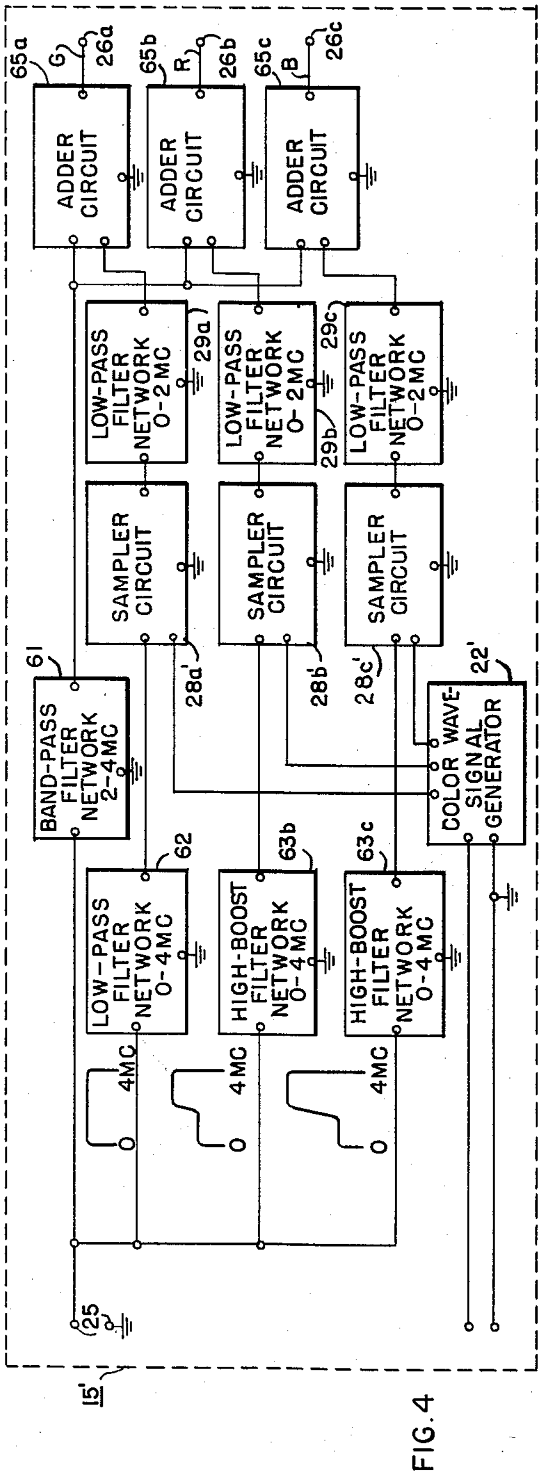
Figure 5:
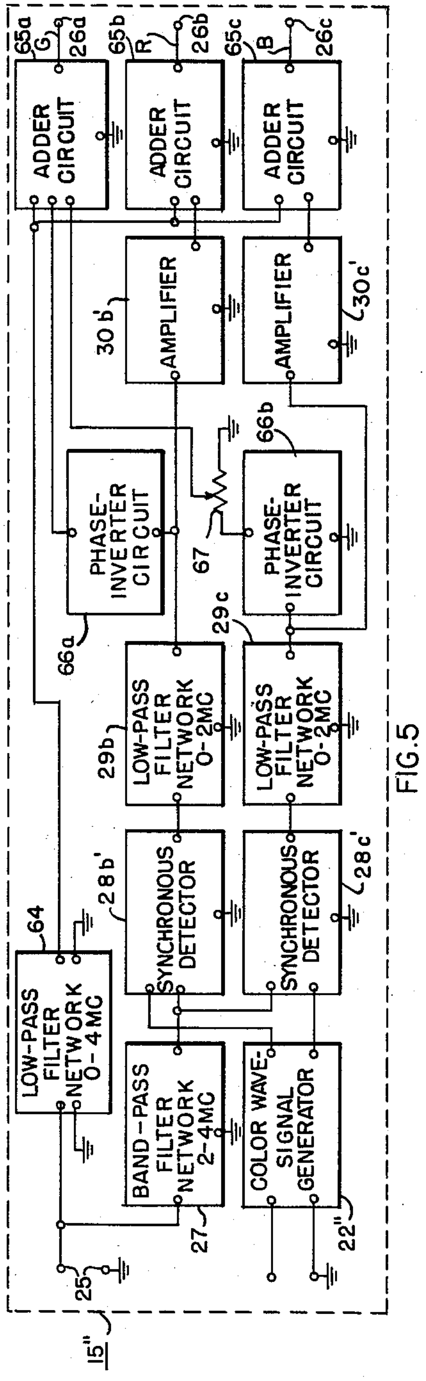

In the drawings:

Figs. 1 and 2 are schematic diagrams of a color-television system, Fig. 1 representing a receiver and Fig. 2 representing a transmitter, each embodying the invention in one form;

Figs. 3*a*, 3*b*, 3*c* are a series of graphs cumulatively representing effective visual brightness characteristics for different primary colors in a receiver of the type of Fig. 1, while Figs. 4 and 5 are schematic diagrams of modifications of the receiver of Fig. 1.

*General description of the color-television receiver of Fig. 1*

In describing the invention, reference will be made first to the receiver, since the signal to be transmitted is determined primarily by the operating characteristics of the receiver. Referring to Fig. 1 of the drawings, there is represented a color-television receiver embodying a signal-translating system in accordance with one form of the invention. This receiver receives signals transmitted from a color-television transmitter, to be described more fully hereinafter, and translates a plurality of received signal components, at least a first of which is primarily representative of the luminance of an image and a second of which is a subcarrier wave signal modulated at different phases by modulation components representative of different color components of said image. The receiver includes a radio-frequency amplifier 10 of any desired number of stages having its input circuit connected to an antenna system 11, 11. Coupled in cascade with the output circuit of the amplifier 10, in the order named, are an oscillator-modulator 12, an intermediate-frequency amplifier 13 of one or more stages, a detector and automatic-gain-control (AGC) circuit 14, a signal-translating system including a signal-translating network 15 to be described in more detail hereinafter, and a color image-reproducing apparatus 16 of the cathode-ray-tube type.

As will be explained more fully hereinafter, apparatus 16 may have a plurality of control characteristics for affecting the luminance and the color of a reproduced image and includes cathode-ray tubes 17*a*, 17*b* and 17*c*, physically positioned at suitable angular relationships with respect to each other, and related circuits for each of the primary color signals developed in the network 15. The apparatus 16 also includes an optical system 18 which may consist of a well-known dichroic mirror-type arrangement for combining the images on the cathode-ray tubes 17*a*, 17*b* and 17*c* into a reproduction of the televised image. Conventional beam-deflecting windings are associated with each cathode-ray tube.

There is also coupled to the detector 14 a synchronizing-signal separator 19, having output circuits connected with a line-scanning generator 20 and a field-scanning generator 21, the output circuits of these generators in turn being connected with the beam-deflecting windings of the cathode-ray tubes 17*a*, 17*b* and 17*c*. An output circuit of the separator 19 is also connected to a sampler-frequency or color wave-signal generator 22 in the network 15. The output circuit of the AGC supply included in the unit 14 is connected to the input circuits of one or more of the tubes of the radio-frequency amplifier 10, the oscillator-modulator 12 and the intermediate-frequency amplifier 13 in a well-known manner. A sound-signal reproducing unit 23 is also connected to the output circuit of the intermediate-frepuency amplifier 13 and may include one or more stages of intermediate-frequency amplification, a sound-signal detector, one or more stages of audio-frequency amplification, and a sound-reproducing device.

It will be understood that the various units thus far described with respect to the receiver of Fig. 1, with the exception of the signal-translating network 15, may have any conventional construction and design, the details of such components being well known in the art rendering a further description thereof unnecessary.

*General operation of the color-television receiver of Fig. 1*

Considering briefly the operation of the receiver of Fig. 1 as a whole but assuming for the moment that the unit 15 is a conventional monochrome type of video-frequency amplifier, a desired modulated television wave signal is intercepted by the antenna system 11, 11. The signal is selected and amplified in the radio-frequency amplifier 10 and applied to the oscillator-modulator 12 wherein it is converted into an intermediate-frequency signal. The intermediate-frequency signal is then selectively amplified in the amplifier 13 and supplied to the detector 14 where its modulation components, being also components of the received signal, are derived. Of these components, the composite video-frequency components are translated through the unit 15 and applied to the control electrodes of the cathode-ray tubes in the unit 16 to modulate the intensity of the electron beam in each tube. The synchronizing-signal components of the received signal are separated from the video-frequency components in the separator 19 and are used to synchronize the operation of the line-scanning and field-scanning generators 20 and 21, respectively. These generators supply signals of saw-tooth wave form which are properly synchronized with reference to the transmitted television signal and applied to the deflecting windings of the cathode-ray tubes in the unit 16, thereby to deflect the cathode-ray beams in each tube in two directions normal to each other to reproduce on each tube the image being televised at the transmitter. The dichroic mirror arrangement 18 optically combines the images on the several tubes and presents the complete reproduced image to the observer.

The automatic-gain-control or AGC signal derived in the unit 14 is effective to control the amplification of one or more of the units 10, 12 and 13 to maintain the signal input to the detector 14 and to the sound-signal reproducing unit 23 within a relatively narrow range for a wide range of received signal intensities.

The sound-signal modulated wave signal accompanying the desired television wave signal is also intercepted by the antenna system 11, 11 and, after amplification in the amplifier 10 and conversion to an intermediate-frequency signal in the unit 12, it is translated through the amplifier 13 to the sound-signal reproducing unit 23. In the unit 23 it is amplified and detected to derive the sound-signal modulation components which are further amplified and reproduced by the reproducing device in a conventional manner.

*Description of signal-translating system of Fig. 1*

Referring now in particular to the signal-translating system of Fig. 1, this system comprises the signal-translating network 15, including an input circuit comprising the terminals 25, 25 for supplying the plurality of received signal components, and the color image-reproducing apparatus 16 and circuits for coupling the network 15 to the apparatus 16. Network 15 and apparatus 16 comprise an image-signal-translating channel as hereinafter claimed. The apparatus 16 has a plurality of color-producing elements, such as red, green and blue phosphors, for producing different colors to which the eye has luminance sensitivities which differ. The color image-reproducing apparatus 16 is of conventional structure for a dot-sequential or simultaneous type of color-television receiver and a brief description thereof has previously been given. Apparatus 16 has a plurality of control characteristics, at least one of these characteristics affecting the luminance of a reproduced image, and at least another or others of these characteristics affecting the color and the luminance of the reproduced image. In particular, in the three-tube system of Fig. 1, the one control characteristic may be considered to be the response of the tube 17*a* to a signal applied to the control electrode thereof to produce a luminance effect on the mirror arrangement 18. Hereinafter, for simplicity of description, the cathode-ray tube which reproduces the green color characteristic will be designated as the green tube, that which reproduces the red color characteristic as the red tube, and similarly the tube reproducing the blue color characteristic as the blue tube. Thus, the tube 17*a* is the green tube, the tube 17*b* the red tube and the tube 17*c* the blue tube. When the green tube 17*a* is considered as acting in the capacity described above, the other control characteristic or characteristics may be considered to be the responses of the red tube 17*b* and/or of the blue tube 17*c* to a signal applied to the control electrode thereof to affect the color and, to some degree, the luminance of the reproduced image.

In other words, the signals applied to the intensity control electrodes of the tubes 17*a*, 17*b* and 17*c* effect two colorimetric operations. They determine the brightness of the reproduced image and the color thereof. The process determining the brightness, if effected by means of one of the tubes or by all of them, is one control characteristic of the apparatus 16, while that determining the color of the image, again if effected by means of one or more of the tubes, is the other control characteristic.

In the arrangement just described, the signal applied to the control electrode of the tube 17*a* may also affect the color of the reproduced image but such effect, with respect to the present consideration of the invention, is incidental. Also, the operational characteristics of the tubes 17*a*, 17*b*, 17*c* may be interchanged in any desired manner so that any one of the tubes may act in the capacity of the tube 17*a* as described above or any one or more of the tubes in the capacities of the tubes 17*b* and 17*c*. If two or more tubes are utilized to control color, then they provide a plurality of other control characteristics, each control characteristic contributing different color effects as well as some luminance effects.

The signal-translating system also comprises the signal-translating network 15 which includes a plurality of signal-translating channels for translating the plurality of received signal components, in particular, video-frequency components, derived in the output circuit of the detector 14. The network 15 comprises one signal-translating channel including an isolation amplifier 24 having a 0–4 megacycle pass band and coupled between the input circuit 25, 25 of the network 15 and the output circuit thereof comprising terminals 26*a*, 26*b*, 26*c* and a common ground. The amplifier 24 comprises means for developing at terminals 26*a*, 26*b* and 26*c* individual signal components of similar signal compositions. The network 15 also includes a plurality of other signal-translating channels including in cascade band-pass filter network 27 common to each of the plurality of channels, a plurality of effectively parallel-connected synchronous detectors 28*a*, 28*b* and 28*c* comprising a detector arrangement and each having an output circuit, and a plurality of similar low-pass filter networks 29*a*, 29*b* and 29*c* individual ones of the input circuits of which are coupled to respective output circuits of the units 28*a*, 28*b* and 28*c*. Each of two of the plurality of signal-translating channels also includes one of similar amplifiers 30*b* and 30*c* connected between the output circuit of one of the units 28*b* and 28*c* and a respective one of terminals 26*b* and 26*c*. The plurality of channels are coupled between the input terminals 25, 25 and separately to the output terminals 26*a*, 26*b* and 26*c*. Individual ones of the terminals 26*a*, 26*b* and 26*c* are also connected to respective ones of the control electrodes of the tubes 17*a*, 17*b* and 17*c* in the unit 16.

The signal-translating system also comprises a circuit for applying the signals translated through the network 15, which correspond to the first or monochrome component and the second or other received signal components, in particular the color-signal components, to the reproducing apparatus 16 to determine the operation thereof with respect to one of the control characteristics thereof. When the response of the tube 17*a* is considered to be the characteristic which determines the luminance of the reproduced image, this circuit includes the circuits connecting the units 24 and 29*a* to the terminal 26*a*, and the circuit connecting this terminal to the control electrode of the tube 17*a*. If either of the tubes 17*b* or 17*c* acts in the capacity of the tube 17*a*, then circuits similar to those associated with the control electrode of the tube 17*a* describe the circuit individual to each tube.

The signal-translating system also comprises a circuit for applying to the apparatus 16 signals translated through the network 15, which correspond to the color-signal components, to determine the operation thereof with respect to the other or other ones of the control characteristics thereof. When the other or other ones of the characteristics affecting the color and the luminance of the reproduced image include the individual responses of the tubes 17*b* and 17*c* to signals applied to the control electrodes thereof, the latter circuit includes the connections between the output circuits of the units 30*b* and 30*c* and the terminals 26*b* and 26*c*, respectively, and the circuits coupling these terminals respectively to the control electrodes of the tubes 17*b* and 17*c*.

The signal-translating characteristics of the network 15 with respect to the video-frequency signal components derived in the detector 14 and applied to the input terminals 25, 25 are such that the monochrome component is translated through the network, particularly through the unit 24, to combine with the signal translated through the unit 29*a* primarily to determine the luminance of the reproduced image appearing on the mirror 18. The proportioning of the parameters of the network 15 is such that the color-signal components derived from the video-frequency signal component present at terminals 25, 25 are translated therethrough, in particular through the units 29*a*, 29*b* and 29*c*, primarily to determine the color of the reproduced image on the mirror 18 and also simultaneously substantially to cancel in the image reproducer 16 any luminance changes which these color-signal components might normally produce therein. In other words, the image-signal-translating channel exemplified by network 15 and apparatus 16 has over-all signal-translation factors for selected modulation components and signals derived therefrom of such magnitudes and phases that the derived signals upon application to the color-producing elements in apparatus 16 have substantial mutually canceling luminance effects when reproduced in color by said color-producing elements, whereby the resultant luminance effect on the eye is minimized. In particular, in the network 15, at least one of the signal-translating channels thereof includes a circuit proportioned to modify, in a manner to be described more fully hereinafter, the amplitude of at least one of the color-signal components relative to the other ones of the color-signal components, such circuit in one channel being the amplifier 30*b* and in another channel the amplifier 30*c*.

While the proportioning of the parameters of the network 15 may be done with respect to one of the channels therein, it may be preferable that it be done with respect to more than one channel and, in particular, with respect to the units 30*b* and 30*c*. Also, such proportioning is uniquely related to the sensitivity of the human eye to the primary colors green, red and blue; that is to the different luminance sensitivities of the eye for green, red and blue. Therefore, it will be helpful, at this time, to analyze in a little more detail this characteristic of the human eye as related to specific cathode-ray-tube phosphors conventionally utilized.

Referring to Fig. 3*a*, there is represented the sensitivity of the eye to colors of equal intensity having wave lengths between 400 and 700 millimicrons. The wave lengths of the blue colors appear approximately between 400 and 500 millimicrons, the green approximately between 500 and 575 millimicrons and the red approximately between 575 and 700 millimicrons. It is evident from these curves, as has previously been stated, that the eye is most sensitive to green, less sensitive to red and least sensitive to blue. Fig. 3*b* represents the relative spectral characteristics of typical blue, green and red phosphors on the screens of the tubes 17*c*, 17*a* and 17*b*, as viewed after color correction. The graph of Fig. 3*c* represents the combination of the graphs of Figs. 3*a* and 3*b* and illustrates the relative luminance effects on the human eye of light signals of equal intensities developed on phosphors having the characteristics defined by the curves of Fig. 3*b*. Fig. 3*c*, therefore, illustrates that, when viewing a color image as reproduced on the mirror 18, the eye is most sensitive to colors in the green region, about one-half as sensitive to colors of similar intensity in the red region and approximately one-twentieth as sensitive to colors of similar intensity in the blue region. More accurately, for certain representative phosphors to be considered hereinafter, the sensitivity of the eye to green is 2.23 times the sensitivity to red and 22.3 times the sensitivity to blue.

Therefore, in view of the different sensitivity of the eye to the different colors and in order to effect optical cancellation of the added noise components previously discussed, the amplifier 30*b* is proportioned to have a gain factor of substantially 2.23 and the amplifier 30*c* a gain factor of substantially 22.3.

It will be understood that the various units thus far described with respect to the network 15, and to be described with respect to similar or analogous networks, as indicated by block diagrams with the possible exception of the units 28*a*, 28*b* and 28*c* may be of any conventional construction and design, the details of such components being well known in the art rendering a further description thereof unnecessary. The synchronous detectors 28*a*, 28*b* and 28*c* may each have a circuit similar to one represented in the Proceedings of the I.R.E. for June 1947 in an article by Donald B. Harris entitled "Selective Demodulation," pages 565–572, inclusive. The circuit referred to is illustrated in Fig. 2, page 569 of the article, and, except for the types of signals applied thereto and derived therefrom, such a circuit could be substituted for any of the units 28*a*, 28*b* and 28*c*. Such a detector may be defined as a device which derives the modulation components of an applied wave signal by utilizing a locally generated wave signal which is in synchronism with and at a predetermined phase with respect to the applied wave signal.

*Explanation of operation of signal-translating system of Fig. 1*

In general the received signal components derived in the detector 14, representing the composite video-frequency signals, are applied to the terminals 25, 25 of the network 15. Signals having frequencies within the band 0–4 megacycles are translated through the amplifier 24 from which similar monochrome signals, each including frequencies up to 4 megacycles, are applied through separate output circuits thereof to the terminals 26*a*, 26*b* and 26*c*. For the purpose of effecting color images in the reproducer 16, components of the composite video-frequency signal which have frequencies within the 2–4 megacycle range are translated through the unit 27 and cyclically and sequentially detected by the detectors 28*a*, 28*b* and 28*c* to develop in the output circuits thereof separate short color-signal component pulses related to the primary color signals green, red and blue. The detectors 28*a*, 28*b* and 28*c* utilize the interaction of the components of the composite video-frequency signal having frequencies in the 2–4 megacycle range with the color wave signal developed in the unit 22, the latter signal being in synchronism and phase with the components just mentioned, to derive the color-signal components. These latter signals are respectively translated through the units 29*a*, 29*b* and 29*c*, two thereof being also separately translated through the amplifiers 30*b* and 30*c*, to be applied respectively to the terminals 26*a*, 26*b* and 26*c*. The color-signal components appearing at the latter terminals are separately combined with the separate monochrome or brightness signal components translated through the unit 24, in a manner to be described more fully hereinafter, to provide primary color signals of high resolution. The latter signals are separately applied to the control electrodes of the cathode-ray tubes 17*a*, 17*b* and 17*c* respectively to produce green, red and blue images corresponding to those present in the related camera tubes at the transmitter. These images are then optically combined by means of the mirror arrangement 18 to develop a reprdouced image for observation.

The color wave-signal generator 22 develops a signal similar in form and frequency to the unmodulated subcarrier which is utilized to convey the color-signal characteristics. The unit 22 is controlled in phase by a signal derived in the synchronizing-signal separator 19 and maintains the detectors 28*a*, 28*b* and 28*c* in synchronism with a sampler or similar devices in the transmitter so that the green, red and blue images reproduced in the separate cathode-ray tubes are synchronized with similar images at the transmitter.

The signals translated through the amplifiers 30*b* and 30*c* are amplified respectively by factors of substantially 2.23 and 22.3 with respect to the signals translated through the unit 29*a*. In order to obtain pure green, red and blue signals on the control electrodes of the tubes 17*a*, 17*b* and 17*c*, respectively, the signal components passing through all of the color channels should have such signal compositions that the monochrome signal translated through the unit 24 may combine therewith to produce the pure color signals. One determination of the composition of the respective signals is, normally at the transmitter, to proportion the relative amounts of the color signals that compose the monochrome signal and then properly proportion the color-signal components respectively developed by the units 29*a*, 30*b* and 30*c* so that they can combine with the monochrome component to produce pure green, red and blue signals.

Instead of developing a monochrome signal composed of equal amounts of green, red and blue signals, as in prior arrangements, the monochrome signal is developed at the transmitter, in a manner to be described more fully hereinafter, so that it is composed of portions of these primary colors in the ratios determined by the sensitivity of the eye to the different colors, that is, of 1 unit of green, 1/2.23 unit of red and 1/22 unit of blue. Such a monochrome signal is conventionally designated as a luminance signal. Thus, on a basis of a sum of unity for the color components, the monochrome signal in the system may be defined by the following equation:

$$Y=0.67G+0.30R+0.03B \qquad (1)$$

where Y represents the monochrome-signal component, and G, R and B represent, respectively, the green, red and blue color signals at the cameras or image-reproducing tubes.

Since the signals being translated through the amplifiers 30*b* and 30*c* in the red and blue channels are amplified respectively by factors of 2.23 and 22.3 in order that the green, red and blue signals may produce desired luminance effects, an inverse operation should take place at the transmitter, in a manner to be described more fully hereinafter. Also, these amplified signals should combine with the monochrome signal defined by Equation 1 to produce, respectively, G, R and B signals. Specifically, the signal translated through the unit 29*a* should combine with the signal defined by Equation 1 to produce a G signal. Therefore, the signals G, R and B are defined by the following equations:

$$G=Y+xg \qquad (2)$$
$$R=Y+yr \qquad (3)$$
$$B=Y+zb \qquad (4)$$

where $g$, $r$ and $b$ represent the color-signal components, respectively, in the output circuits of the networks 29*a*, 29*b* and 29*c*, and $x$, $y$ and $z$ are the gain factors, respectively, of the channels through which the components $g$, $r$ and $b$ pass before combining with the monochrome component.

Assuming that the component $g$ is to be translated with a gain of unity and that the gains of the components $r$ and $b$ are varied with respect to it, the value of $x$ is then 1 and Equation 2 becomes:

$$g=G-Y \qquad (5)$$

Substituting in (5) the value of Y as defined by Equation 1, the following relation is obtained:

$$g=G-0.67G-0.30R-0.03B \qquad (6)$$

or $$g=0.33G-0.30R-0.03B \qquad (7)$$

Similarly, using Equations 1 and 3, since $y$ has a value of 2.23 as stated above, $r$ is defined by the equation:

$$r=\frac{R}{2.23}-\frac{Y}{2.23} \qquad (8)$$

or $$r=0.31R-0.30G-0.01B \qquad (9)$$

In a similar manner Equation 4 becomes:

$$b=0.04B-0.03G-0.01R \qquad (10)$$

The color-signal components defined by Equations 7, 9 and 10 combine with the monochrome-signal component defined by Equation 1, after appropriate amplification of the components defined by Equations 9 and 10, to provide pure green, red and blue signals.

When the signal-translating channels are proportioned in the manner described above, added low-frequency noise-signal components developed by the heterodyning of the sampling frequency with random noise-signal components having frequencies in the vicinity thereof may be effectively optically canceled. In a three-phase sampling system of the type described, similar added noise-signal components occur in each sampling channel but are 120° out of phase with respect to each other. The algebraic sum of the energies of such added noise-signal components over any one cycle at the sampling frequency is zero. By proportioning the network 15, and particularly the amplifiers 30*b* and 30*c*, in the manner described above so that electrical signals of equal energy have equal brightness or luminance effects on the human eye, the added noise-signal components are effectively algebraically added in the human eye and therefore produce no brightness effect thereon. In addition, by the same proportioning of the network 15, the color-signal components produce no luminance effects, all brightness effects being determined by the monochrome or brightness component of the received signal.

An example may be helpful in understanding the cancellation of the added noise-signal components and the manner in which the color-signal components produce no luminance effects. Assume that the color in an elemental area of a reproduced image is to be composed of predetermined amounts of green, red and blue and that the color-signal components, in addition to conveying the color information, are affected by added low-frequency noise-signal components. It may be assumed that a small noise-signal component occurs at a frequency of 3.3 megacycles, which when heterodyned with the 3.8 megacycle sampling frequency produces an added noise-signal component having a frequency of 0.5 megacycle. This added component may further be assumed to have a relative signal strength of .01 unit. In the green channel, the added component would not receive any relative amplification and would appear on the green tube with a value of .01 unit at a reference phase of 0°. The added component would be amplified by a factor of 2.23 in the red channel and appear on the red tube with a value of .0223 at a reference phase of 120°. In a similar manner, the added component would be amplified by a factor of 22.3 in the blue channel and appear on the blue tube with a value of .223 unit at a reference phase of 240°.

It is seen that the relative values of the green, red and blue signals have been changed by the added noise-signal component thus causing these added components to produce color fluctuations. As previously stated, the eyes are relatively insensitive to such fluctuations. On the other hand, the effective luminance of these signals to the observer will be, relatively, .01 for green, .0223/2.23 or .01 for red and .223/22.3 or .01 for blue at the above-mentioned phase angles. Thus, it is seen that the added noise-signal component has been made to affect the brightness in the different tubes in such a manner as effectively to be canceled because of the relative phase angles.

Since signals in the 2–4 megacycle range other than the type of noise signals just discussed, in the absence of the present invention, would produce low-frequency brightness fluctuations, the invention further teaches that the low-frequency brightness fluctuations resulting from these other signals may effectively be canceled in the same manner in which the noise signals referred to are canceled. For this reason, it can be said that, in order to practice the invention, the color-signal components produce no luminance effects, all brightness effects being determined by the monochrome or luminance component of the received signal.

It is to be understood that, when a mixed-high type of color-television receiver is employed, where the color wave subcarrier frequency may incidentally appear in the channel translating the luminance-signal component, and thereby affect the brightness of elemental areas of the reproduced image, these luminance effects will be canceled over two elemental areas so that all such luminance effects are substantially canceled.

*Description of color-television transmitter of Fig. 2*

Referring now more particularly to Fig. 2 of the drawings, there is illustrated a color-television transmitter for producing and transmitting the signal components utilized in the receiver of Fig. 1. The transmitter comprises a unit 31 for generating color signals during trace periods. This device may be of conventional design including one or more cathode-ray signal-generating tubes but, for the purposes of simplicity in description, it will be assumed that it includes three cathode-ray tubes each individually responsive to different colors, in particular to the primary colors green, red and blue. The cathode-ray tubes may have the usual electron-gun structure and photosensitive targets and line-scanning and field-scanning means. There are also provided in the transmitter, a line-scanning generator 32 and a field-scanning generator 33 having their output circuits connected directly to the line-scanning and field-scanning means in the unit 31. In order to provide blanking pulses for blocking out or for suppressing undesirable impulses in, and ensuring the proper wave form of, the modulation signal developed by the unit 31, there is provided a blanking-pulse generator 34 having its output circuit coupled to the control electrodes of the cathode-ray tubes in the unit 31. A synchronization-impulse generator 35 is also provided for developing synchronizing impulses for modulating the signal to be transmitted, thereby effecting synchronization between the transmitter and the receiver. An output circuit of the generator 35 is connected to a modulation-frequency amplifier 36, to be referred to more fully hereinafter, and to a sampler-frequency generator 37 also to be referred to hereinafter. In order to synchronize the operations of the generators 32, 33, 34 and 35, there is provided a timing-impulse generator 38 having a plurality of output circuits coupled to the input circuits of the generators just mentioned.

Connected in cascade to the output circuits of the signal-generating tubes in device 31, in the order named, are a signal-translating network 39 for developing the monochrome and composite color-signal component in a manner to be further described in detail hereinafter, the modulation-frequency amplifier 36, a modulator 40 having an oscillator 41 coupled thereto, and a power amplifier 42, the signal output of the latter being applied to an antenna system 43, 43.

*General operation of transmitter of Fig. 2*

Considering now the general operation of the transmitter of Fig. 2 as thus far described and neglecting for the moment the detailed operation and description of the signal-translating network 39 constructed in accordance with the present invention, the transmitter includes the components of one type of conventional color-television transmitter, all the components illustrated schematically being of any well-known suitable construction. Briefly, the image of the scene to be televised is focused upon the targets of the individual cameras in the unit 31 and the cathode-ray beams of the several camera tubes are developed, accelerated and individually focused on the separate targets. Color-filter systems present in unit 31 for each camera tube determine the distinctive primary colors separately focused on individual targets. Conventional scanning or deflection currents developed by the generators 32, 33 are utilized to deflect the beams to scan successive fields of parallel lines on the targets. Blanking pulses developed by the generator 34 are applied to the control electrodes of the camera tubes to suppress or block out the scanning beam during retrace intervals of the scanning cycles and are applied to the amplifier 36 to suppress or block out undesirable pulses developed in the transmitter-receiver system and to aid in obtaining the required wave form of the video-modulation signal applied to the unit 36.

The photosensitive elements of camera targets are electronically affected by the varying values of light and shade at corresponding incremental areas of the image focused thereon, as the cathode-ray beams scan the targets, and signals of correspondingly varying amplitude are developed in the output circuit of each of the camera tubes and separately applied to the network 39. These color signals are then combined in the unit 39, in a manner to be described more fully hereinafter, to form at least a first signal or monochrome signal primarily representative of the luminance of an image and substantially independent of its color characteristics and at least a second signal or color-signal component primarily representative of a color characteristic of the image. Signals developed in the network 39 are amplified in the amplifier 36, applied to the modulator 40 to modulate a carrier-wave signal generated by the oscillator 41 and are transmitted by means of the power amplifier 42 and the antenna system 43, 43.

*Description of signal-translating network of Fig. 2*

Referring now more particularly to the signal-translating network 39 embodying one form of the present invention, this network comprises means for developing the composite video-frequency components utilized in the receiver of Fig. 1 to determine the luminance and color characteristics of the image-reproducing apparatus therein. The network comprises means for developing at least a monochrome-signal component primarily representative of the luminance of an image and substantially independent of its color characteristic. This means includes similar low-pass filter networks **44*a*, 44*b* and 44*c*, voltage dividers 45*a*, 45*b* and 45*c*, buffer circuits 46*a*, 46*b* and 46*c*, corresponding ones of which are individually connected in cascade between input terminals 47*a*, 47*b* and 47*c* and the input circuit of a 0–4 megacycle low-pass filter network 57, the output circuit of which is coupled to an adder circuit 58**.

The network 39 also includes means for developing at least a color-signal component primarily representative of a color characterisitc of the image. Similar means are individually provided for the green, red and blue signals appearing respectively at terminals **47*a*, 47*b* and 47*c*. The means for developing the portion of the color-signal component primarily representative of the green color characteristic of the image includes a low-pass filter network 49*a*, a voltage divider 50*a*, and a buffer circuit 51*a* connected in cascade between the terminal 47*a* and one of the contacts of a symmetrical electronic sampling device 53 represented diagrammatically and having a sampling frequency of approximately 3.8 megacycles. The device 53 is more fully described in the RCA Review article referred to previously. The means for developing a color-signal component primarily representative of the green color characteristic of the image also includes a phase-inverter circuit 54*a* and a voltage divider 55*a*, connected in cascade between the filter network 49*a* and through a buffer circuit $56a_1$ to a contact of the sampling device 53. The latter means also includes a buffer circuit $56a_2$ having an input circuit connected to the voltage divider 55*a* and an output circuit connected to another contact of the device 53. Similar means are provided for the red color signals applied to the terminal 47*b* and the blue color signals applied to the terminal 47*c*, cross-coupling circuits between the output circuits of the buffer circuits through which the color signals are translated being included to provide proper proportions and phase relationships of the red, green and blue signals at the different stationary contacts of the device 53. Such circuits are conventionally designated as matrixing circuits. The output circuit of the sampling device 53 is coupled through a 2–4 megacycle band-pass filter network 59 to an input circuit of the adder circuit 58, the output circuit of which is coupled to the modulation-frequency amplifier 36 through a low-pass 0–4 megacycle filter network 60**.

In the above description of the unit 39 it is to be understood that conventional additional amplifier stages may be utilized throughout wherever such stages may be required.

*Explanation of the operation of signal-translating network of Fig. 2*

The network just described includes either well-known components or components fully described in the RCA Review previously referred to. These components have been schematically represented and a detailed description of each of these components and their operation is considered to be unnecessary herein. The combined operations of these well-known components in the network 39 will be described.

In the network 39 the color signals corresponding to the primary colors green, red and blue of the scene being televised are separately applied to the terminals **47*a*, 47*b* and 47*c*. The green, red and blue signals, each having a band width of 0–4 megacycles, are respectively translated through the units 44*a*, 44*b* and 44*c* and are developed respectively across the voltage dividers 45*a*, 45*b* and 45*c*. In order to develop the first or monochrome signal having the composition as defined by Equation 1 above for use in the receiver, relative amounts of 0.67G, 0.30R and 0.03B are selected respectively from the voltage dividers 45*a*, 45*b* and 45*c*. Signals having these proportions are then separately translated through the buffer circuits 46*a*, 46*b* and 46*c*, and collectively through the filter network 57, to apply to the adder circuit 58** such a monochrome signal.

In a manner similar to that in which the monochrome signal is developed as described above, red, green and blue color signals are translated through their respective low-pass filter networks **49*a*, 49*b* and 49*c* and the phase inverters 54*a*, 54*b* and 54*c*, respectively, to develop red, green and blue signal components, each having a band width of 0–2 megacycles, across the voltage dividers 50*a*, 50*b* and 50*c* and respectively to develop negative green, red and blue signal components of similar band widths across the voltage dividers 55*a*, 55*b* and 55*c*. Proper amounts and phases of the green, red and blue signal components are then mixed, after passing through buffer circuits, to provide on indivdual ones of the stationary contacts of the device 53 color-signal components composed in accordance with Equations 7, 9 and 10 respectively. These signals are sequentially sampled at the sampling frequency of approximately 3.8 megacycles to produce composite color-signal components having a narrow pulse form, the amplitudes of which are proportional to the intensity of the color-picture element then being scanned by the camera in the unit 31. The sequential operation of the sampler 53 produces a succession of these narrow pulses in a predetermined sequence which, when converted into a resultant sine wave by being translated through the network 59 and combined in the unit 58 with the 0.4 megacycle brightness signals, form composite video-frequency signals. The composite video-frequency signals are then translated through the network 60 and the amplifier 36**.

The sampling process develops a composite color signal, prior to the combination with the luminance signals, which includes a sine wave or color subcarrier wave signal of a frequency of approximately 3.8 megacycles. The subcarrier wave signal has amplitude and phase characteristics related to the three different color-signal characteristics, being modulated in succession at 120° intervals by the color-signal components.

The composite video-frequency signal applied to the amplifier 36 therefore has a monochrome-signal component as defined by Equation 1 and green, red and blue or a second signal component as defined by Equations 7, 9 and 10 primarily representative of the color characteristics of the image. When these received signal components are derived at the receiver, there are thus provided monochrome and color-signal components in such proportion that the proportioning which takes place in the network 15 of the receiver of Fig. 1 results in the production on the control electrodes of the cathode-ray tubes of unit 16 of pure green, red and blue signals. Thereby fidelity of color is maintained while incidental noise brightness fluctuations present in the color signals are optically canceled.

*Description of signal-translating network of Fig. 4*

The signal-translating network of Fig. 4 is analogous to the unit 15 of Fig. 1, similar circuit components being designated by the same reference numerals and analogous components by the same reference numerals primed. The network of Fig. 4 differs from that of the unit 15 in that a band-pass filter network 61 is provided in the first signal-translating channel of the former. In addition, with respect to the other channels of the network of Fig. 4, a 0–4 megacycle low-pass filter network 62, having substantially uniform frequency-translating characteristics, is included in one thereof, while two of these other channels include 0–4 megacycle filter networks **63*b* and 63*c* having high-boost or gain characteristics, as indicated by the associated curves, for signals within the band of 2–4 megacycles, the unit 63*b* providing a gain of 2.23 for the color-signal components relative to the low-frequency monochrome-signal components, whereas the unit 63*c* provides a relative gain of 22.3. The synchronous detectors 28*a*, 28*b* and 28*c* are also replaced by three coordinated sampling devices 28*a*′, 28*b*′ and 28*c*′ and similar adder circuits 65*a*, 65*b* and 65*c* are individually included in the color-signal channels to combine the monochrome signal translated through the unit 61 with each of the color-signal components. Such adder circuits may include the function of the isolation amplifier 24** of Fig. 1.

*Operation of signal-translating network of Fig. 4*

The signal-translating network of Fig. 4 operates in a manner similar to that of network 15 of Fig. 1, except that the monochrome signal, instead of passing through one channel as in network 15 of Fig. 1, is divided into frequency bands of 0–2 megacycles and 2–4 megacycles and is translated through different channels. Such modification also requires other modifications with respect to the gain-controlling devices in the red and blue signal translating channels. Thus, the 2–4 megacycle portion of the monochrome signal is translated through the channel including the unit 61 while the 0–2 megacycle portion is translated through the green, red and blue channels, respectively including the low-pass filter networks **29*a*, 29*b*, and 29*c*. In view of the fact that the 0–2 megacycle portion of the monochrome signal occurs in the red and blue channels, it is not practical to use simple amplifiers, such as the units 30*b* and 30*c* of the network 15 of Fig. 1 in the output circuits of the units 29*b* and 29*c* of Fig. 1, to provide the desired color-signal component gain, since such amplifiers would also amplify the 0–2 megacycle portion of the monochrome signal correspondingly. Therefore, in order to provide the required color-signal component gain, there are provided the high-boost filter networks 63*b* and 63*c*, proportioned to have the required gain for the color-signal components, in other words for the frequency band 2–4 megacycles. Since no such color-signal component gain is needed in the unit 62, the frequency-translation characteristic of this unit is uniform. The unit 63*b* boosts the red color-signal component by 2.23 and the unit 63*c* boosts the blue component by 22.3 relative to the monochrome signal. Luminance noise is thus canceled by proportioning the signal-translating characteristics of the units 62, 63*b* and 63*c*** to produce color-signal effects similar to those described with reference to Fig. 1.

*Description of signal-translating network of Fig. 5*

The signal-translating network of Fig. 5 is analogous to units 15 and 15′ of Figs. 1 and 4, similar circuit components being designated by the same reference numerals and analogous components by the same reference numerals double primed.

In the network 15 of Fig. 1 the blue signal component in the output circuit of the low-pass filter network **29*c*** requires an amplification of 22.3 times the amplification in the green signal component channel. Thus, in order to permit such an amplification and maintain fidelity, it is necessary to attenuate the blue signal component at the transmitter by a similar amount.

As stated above, to provide added noise cancellation in a three-phase sampling system of the type represented in Fig. 1, the luminance effect of the green, red and blue cathode-ray tubes must combine to equal zero. In order to have adequate cancellation over all values of added noise, the tubes should operate over the linear portion of their color amplitude-response characteristics. If large added noise signals are applied to the blue tube to combine with those on the green and red tubes to effect cancellation, under certain circumstances the blue tube may operate over a nonlinear portion of its color amplitude-response characteristic. It is preferable to effect noise cancellation by means of pairs of cathode-ray tubes. The network represented by Fig. 5 represents such an arrangement.

Though the latter network is designed to effect the result described above, such an arrangement also reduces the number of components required at both the transmitter and receiver and minimizes the intermodulation noise produced by slight phase errors in the green and red signals when the blue signal is greatly attenuated and, later, greatly amplified.

The network of Fig. 5 includes one channel directly coupled to the terminals 25, 25 and includes a low-pass 0–4 megacycle filter network 64 supplying an output signal to the adder circuit **65*a*. In addition to this channel there is coupled to the terminals 25, 25 the band-pass filter network 27 for selecting a band of signals of those passing through the channel including the unit 64. The output circuit of the unit 27 is coupled to the input circuits of two synchronous detectors 28*b*′ and 28*c*′, the output circuits of which are respectively coupled to two other signal-translating channels each having in cascade a low-pass filter network, an amplifier and an adder circuit. There are coupled between the 0–2 megacycle filter network 29*b* in one of these other channels and the adder circuit 65*a* of the channel, a phase inverter 66*a* and, in the remaining other channel, between the 0–2 megacycle filter network 29*c* and the adder circuit 65*a*, a series-connected phase inverter 66*b* and voltage divider 67. The units 66*a* and 66*b* and the resistor 67** comprise matrixing apparatus for developing a signal representative of green from the signals representative of red and blue.

The color wave-signal generator 22″ is controlled in phase in the manner previously described with reference to analogous units and provides control effects in quadrature to the detectors **28*b*′ and 28*c*′**.

*Operation of signal-translating network of Fig. 5*

Before considering the operation of the signal-translating network of Fig. 5 it will be helpful to discuss the modifications that should be made to a transmitter of the type represented by Fig. 2 to provide the type of signals useful in a network of the type represented by Fig. 5. The manner of composing these signals at the transmitter is analogous to that previously described with relation to Fig. 2. The circuits of the transmitter are proportioned and intercoupled in a manner suitable to develop the desired signals. Instead of using the sampling device 53 of Fig. 2, which may be considered to be a three-phase sampler, one of the stationary contacts thereof may be open-circuited and the sampling device readjusted to be one which could be considered to be a two-phase quadrature sampler. In this way the monochrome signal and the two signals conveying the color characteristics are developed.

In the network of Fig. 5, the signal passing through the unit 64 has a composition as defined by Equation 1 above. The signal passing through the unit 29b, hereinafter designated as $s_{29b}$, for example, may be defined by the equation:

$$s_{29b}=-0.30G+0.314R-0.013B \quad (11)$$

The signal passing through the unit 29c, for example, may be defined by the equation:

$$s_{29c}=-0.134G-0.06R+0.194B \quad (12)$$

The amplifier 30b' is proportioned to have a gain of 2.23 so that the combination of signal $s_{29b}$ with the signal Y in the adder circuit 65b results in a pure red color signal defined by the following equation:

$$R=0.67G+0.30R+0.03B+2.23(-0.30G+0.314R-0.013B) \quad (13)$$

or $$R=R \quad (14)$$

The amplifier 30c' is proportioned to have a gain of 5 and, by combining signals Y and $s_{29c}$ in the circuit 65c there is provided an output signal of pure primary blue. Thus:

$$B=0.67G+0.30R+0.03B+5(-0.134G-0.06R+0.194B) \quad (15)$$

or $$B=B \quad (16)$$

Pure green or G is obtained by combining the monochrome signal with proper proportions of the signals $s_{29b}$ and $s_{29c}$ in the unit 65a. Thus:

$$G=Y-s_{29b}-0.22s_{29c} \quad (17)$$

which, when proper substitutions are made, gives approximately the result:

$$G=G \quad (18)$$

The phase inverter 66a and the unit 66b in conjunction with the voltage divider 67 provide the proper amounts and phases of the signals $s_{29b}$ and $s_{29c}$ for Equation 17. Thus, it is seen that a two-phase quadrature sampling device and proper signal compositions may be utilized at the receiver to provide primary color signals of pure green, red and blue. Such signals are provided with only an attenuation of a factor of 5 at the transmitter for the signal which primarily represents blue but provide primary color signals, pairs of which optically combine to cancel any added noise-signal components.

It is seen that a negative unit of the signal $s_{29b}$ is applied to the green tube while +2.23 units of the same signal are applied to the red tube. In a similar manner, −0.22 unit of the signal $s_{29c}$ is applied to the green tube while +5 units of the same signal are applied to the blue tube, thereby providing on the green and blue tubes amounts of this signal which are inversely proportional to the luminance effects of the green and blue signals. By means of the application of the signals to the tubes in the proportions just discussed, both the signals $s_{29b}$ and $s_{29c}$ are prevented from affecting the luminance of the picture.

*Description of modified Fig. 1 embodiment of signal-translating network*

A network of the type represented by Fig. 5, in which the cross-coupling circuits are eliminated, may be desirable for some applications. Such coupling may be eliminated by utilizing asymmetrical sampling (where the sampling occurs at nonuniform intervals) instead of the symmetrical sampling (where the sampling occurs at uniform intervals) previously described with reference to the Fig. 5 network. A circuit arrangement of the type represented by Fig. 1, wherein the unit 22 is adjusted to provide asymmetrical sampling in the manner described hereinafter, would provide the desired network.

When utilizing the Fig. 1 arrangement for the above-mentioned purpose, the channels including the detectors 28b and 28c replace the channels, in the Fig. 5 arrangement, which include the detectors 28b' and 28c', signals similar to those utilized in the Fig. 5 channels being translated therethrough. The cross-coupling of the Fig. 5 arrangement is then effectively provided, in the Fig. 1 arrangement, by utilizing the channel including the detector 28a in combination with asymmetrical sampling by unit 22 of the signals present in the channels including the units 28b and 28c. In addition to the above, the amplifier 30c of the Fig. 1 arrangement is adjusted to provide a gain of only 5 instead of 22.3.

*Operation of modified Fig. 1 embodiment of signal-translating network*

In the modified Fig. 1 arrangement, the compositions of the signals respectively in the channels at the output circuits of the units 24, 28b and 28c are defined by Equations 1, 11 and 12 above. It is seen that with the network of Fig. 5 the pure green signal was obtained by subtracting proper amounts of red and blue signals from the monochrome signal. To effect such a result, it was necessary to cross-couple the green, red and blue circuits so that the desired amounts of red and blue could be subtracted from the monochrome signal to obtain pure green. As has previously been stated, such cross-coupling is sometimes undesirable and other means of effecting the same result as such cross-coupling would produce, even though a less pure green signal is obtained, may be considered to be more acceptable.

In the modified Fig. 1 network, if the green signal sampling time is positioned 180° out of phase with the red signal sampling time, then the type of signal provided by the phase inverter 66a of Fig. 5 is effectively provided. Thus, if the signal defined by Equation 11, present in the input circuit of detector 28a, is sampled 180° out of phase with the sampling time of the signal defined by Equation 12, and the signal thereby obtained is translated through the network 29a, there is provided a signal of the following composition in the output circuit thereof:

$$s_{29a}=+0.30G-0.314R+0.013B \quad (19)$$

which when combined with the monochrome signal of Equation 1 gives:

$$Y+s_{29a}=0.67G+0.30R+0.03B+0.30G-0.314R+0.013B \quad (20)$$

or $$Y+s_{29a}=0.97G-0.014R+0.043B \quad (21)$$

Such a green signal still retains 0.043 unit of blue and a negative amount of 0.014 unit of red, being approximately 0.97 unit pure green. A green signal of this type probably would be pure enough for ordinary usage and would be effective substantially to cancel red and green brightness noise. In an arrangement of this type, the blue signal could be sampled in the detector 28c in quadrature with or at 270° from the green signal sampling time.

A much purer green signal may be obtained by arranging the sampling in such a manner as to effect blue signal cancellation in the green signal as well as red signal cancellation. If, instead of having relationships of 0°, 180° and 270°, the sampling times of the green, red and blue color signals are respectively chosen to be 0°, (180°−12.5°) and (270°−12.5°), then the green signal will be defined by the equation:

$$G=Y-(\cos 12\tfrac{1}{2}°)s_{29b}-(\sin 12\tfrac{1}{2}°)s_{29c} \quad (22)$$

or $$G=Y-0.976s_{29b}-0.216s_{29c} \quad (23)$$

Utilizing the Equations 11 and 12 as given above, the resultant green signal is defined by the equation:

$$G = .99G + .007R + .0007B \quad (24)$$

being therefore approximately a pure green signal. Thus, asymmetrical sampling may be utilized in place of the cross-coupling arrangements of the network represented by Fig. 5 substantially to accomplish the same results, to provide the advantages of two-phase type sampling while retaining the components of a three-phase cancellation system for luminance noise.

The transmitted signals that might be used in the modified Fig. 1 or Fig. 4 arrangements would be simply produced, even if symmetrical three-phase sampling, such as that represented by Fig. 2, were used, by applying the proper proportions and phases of the green, red and blue signals to the sampler 53 of Fig. 2. These values may be determined by mathematically defining the components of the signals $s_{29b}$ and $s_{29c}$, defined respectively by Equations 11 and 12 above, along the selected 120° sampling positions. Thus, for three-color-signal components $s_1$, $s_2$ and $s_3$:

$$s_1 = -s_{29b}\cos 12.5° - s_{29c}\cos 77.5° \quad (25)$$
$$= +0.322G - 0.294R - 0.029B \quad (26)$$
$$s_2 = +s_{29b}\cos 47.5° - s_{29c}\cos 42.5° \quad (27)$$
$$= -0.104G + 0.256R - 0.152B \quad (28)$$
$$s_3 = +s_{29b}\cos 72.5° + s_{29c}\cos 17.5° \quad (29)$$
$$= -0.218G + 0.037R + 0.181B \quad (30)$$

where the signals to be sampled are defined as:

$$S_1 = Y + s_1 \quad (31)$$
$$S_2 = Y + s_2 \quad (32)$$
$$S_3 = Y + s_3 \quad (33)$$

With respect to the embodiments of the invention described herein, a substantial improvement in compatibility has been obtained by utilizing a much reduced amplitude of the composite color signal as compared to that of the composite color signal in the prior art arrangement discussed above. It is to be understood that the present invention may be practiced by arrangements which may represent compromises in these amplitude characteristics as defined herein and in the prior art system. For example, the composite color signal may have an amplitude 3 decibels higher than that described with reference to the system herein. In such a case, for example in the Fig. 4 arrangement, the network 62 may provide a 3 decibel reduction of the high-frequency signals translated therethrough with respect to the low-frequency signals and 3 decibels less high boost will then be required in the networks **63*b* and 63*c***.

In addition, though the invention has been described with reference to receivers or transmitters utilizing a plurality of cathode-ray tubes to effect color transmission and reproduction, the invention applies equally well to a system using any number of cathode-ray tubes or a single multicolor cathode-ray tube for similar purposes.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television system including a receiver of the constant luminance type which uses a compatible signal including luminance- and chrominance-representative signals, a color-television transmitting system comprising: means for developing a plurality of color signals representative of different color components of an image, said color components being colors to which the eye has luminance sensitivities which differ; means for developing a signal representative of the luminance of said image and representing said colors in proportion to said luminance sensitivities; means responsive to said color signals for developing a chrominance-representative signal comprising a wave signal modulated at different phases by modulation components representative of the difference between said color signals and said luminance signal; and means for transmitting said developed luminance and wave signals.

2. In a color-television system including a receiver of the constant luminance type which uses a compatible signal including luminance- and chrominance-representative signals at least partially occupying a common frequency band, a color-television transmitting system comprising: means for developing a plurality of color signals representative of different color components of an image, said color components being colors to which the eye has luminance sensitivities which differ; means for developing a signal representative of the luminance of said image and representing said colors in proportion to said luminance sensitivities; means responsive to said color signals for developing a chrominance-representative signal comprising a wave signal modulated at quadrature phases by modulation components representative of the difference between two of said color signals and said luminance signal; and means for transmitting said developed luminance and wave signals.

3. In a color-television system including a receiver of the constant luminance type which uses a compatible signal including luminance- and chrominance-representative signals, a color-television transmitting system comprising: means for developing a plurality of color signals representative of different color components of an image, said color components being colors to which the eye has luminance sensitivities which differ; means for developing a signal representative of the luminance of said image and representing said colors in proportion to said luminance sensitivities; means responsive to said color signals for developing a chrominance-representative signal comprising a wave signal modulated at different phases by modulation components representative of said color signals and for proportioning said modulation components to effect reproduction of said image in the constant luminance receiver with proper color fidelity when combined with said luminance signal; and means for transmitting said developed luminance and wave signals.

4. In a color-television system including a receiver of the constant luminance type which derives at given phase angles of a received modulated color-television wave signal modulation components representative of the chrominance of a composite color image to be reproduced and which is proportioned to provide signal-transfer factors for said modulation components effective to minimize the resultant luminance effect of said modulation components on the eye when reproduced in color by said receiver, a color-television transmitting system comprising: means for developing a plurality of color signals representative of different color components of an image, said color components being colors to which the eye has luminance sensitivities which differ; means for developing a signal representative of the luminance of said image and representing said colors in proportion to said luminance sensitivities; means responsive to said color signals for developing a wave signal modulated at different phases by modulation components representative of the chrominance components of said color signals in such proportions that the relative amplitude values of said modulation components apparent at the given phase angles of derivation in said receiver are inversely related to the signal-transfer factors for said modulation components in the receiver; and means for transmitting said developed luminance and wave signals.

5. A color-television transmitter comprising: means for developing a plurality of color signals representative of different color components of an image, said color components being colors to which the eye has luminance sensitivities which differ; means for combining said color signals to produce a luminance signal constituted by a portion of each of said color signals such that each portion is proportional to the said luminance sensitivity for the color represented thereby; means for generating a wave signal; means including a modulator for utilizing said color signals to modulate said wave signal at different phases; and means for combining said luminance signal and said modulated wave signal for transmission.

References Cited in the file of this patent

UNITED STATES PATENTS

| | | |
|---|---|---|
| 2,735,886 | Schlesinger | Feb. 21, 1956 |
| 2,748,189 | Bedford | May 29, 1956 |
| 2,761,007 | Fisher | Aug. 28, 1956 |
| 2,773,116 | Chatten | Dec. 4, 1956 |